US008528019B1

(12) United States Patent
Dimitrova et al.

(10) Patent No.: US 8,528,019 B1
(45) Date of Patent: Sep. 3, 2013

(54) METHOD AND APPARATUS FOR AUDIO/DATA/VISUAL INFORMATION

(75) Inventors: Nevenka Dimitrova, Yorktown Heights, NY (US); Thomas McGee, Garrison, NY (US); Jan Hermanus Elenbaas, New York, NY (US); Lalitha Agnihotri, Fishkill, NY (US); Radu Jasinschi, Ossining, NY (US); Serhan Dagtas, Croton-On-Hudson, NY (US); Aaron S Mendelsohn, Dobbs Ferry, NY (US)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 09/442,960

(22) Filed: Nov. 18, 1999

(51) Int. Cl.
  *G06F 3/00* (2006.01)
  *G06F 13/00* (2006.01)
  *H04N 5/445* (2006.01)

(52) U.S. Cl.
  USPC ............... 725/46; 725/14; 725/19; 725/27; 725/28; 725/45; 725/47; 382/111

(58) Field of Classification Search
  USPC .............. 382/118; 725/14, 19, 28, 27, 45–47
  See application file for complete search history.

(56) References Cited

U.S. PATENT DOCUMENTS

| | | | | |
|---|---|---|---|---|
| 5,012,522 | A | * | 4/1991 | Lambert ................... 382/118 |
| 5,038,211 | A | | 8/1991 | Hallenbeck ................ 358/142 |
| 5,410,344 | A | * | 4/1995 | Graves et al. ................. 725/46 |
| 5,481,296 | A | * | 1/1996 | Cragun et al. ............... 725/136 |
| 5,519,780 | A | | 5/1996 | Woo et al. .................... 380/49 |
| 5,583,576 | A | * | 12/1996 | Perlman et al. ............... 725/28 |
| 5,629,733 | A | | 5/1997 | Youman et al. ................. 348/7 |
| 5,635,989 | A | * | 6/1997 | Rothmuller ................... 725/46 |
| 5,650,826 | A | | 7/1997 | Eitz .............................. 348/468 |
| 5,699,125 | A | * | 12/1997 | Rzeszewski et al. ........... 725/50 |
| 5,703,655 | A | | 12/1997 | Corey et al. ................... 348/468 |
| 5,760,821 | A | | 6/1998 | Ellis et al. ...................... 348/10 |

(Continued)

FOREIGN PATENT DOCUMENTS

| | | |
|---|---|---|
| DE | 4106750 A1 | 9/1992 |
| DE | 19736385 A | 2/1999 |

(Continued)

OTHER PUBLICATIONS

"Modern Information Retrieval", ACM Press 1999, pp. 24-34.

(Continued)

*Primary Examiner* — Jason Salce

(57) ABSTRACT

A method of selecting, storing and delivering desired audio/data/visual information includes the steps of determining viewing preferences of a viewer and receiving a first group of audio/data/visual signals, for example, broadcast and cable television signals or internet-based signals. Based on the first group of audio/data/visual signals, a second group of audio/data/visual signals, which is a subset of the first group of audio/data/visual signals, is identified. The second group of audio/data/visual signals is selected based on the association of EPG data for each signal with the viewing preferences of the viewer. Content data is then extracted from the second group of audio/data/visual signals and compared with the viewing preferences. The content data may include, for example, closed-captioned text, EPG data, audio information, visual information and transcript information. Based on the comparison of the content data extracted from the second group of audio/data/visual signals with the viewing preferences, audio/data/visual information contained in the second group of audio/data/visual signals which is of interest to the viewer is identified and stored for review at the viewers convenience.

82 Claims, 2 Drawing Sheets

(56) References Cited

U.S. PATENT DOCUMENTS

| | | | |
|---|---|---|---|
| 5,809,471 A | 9/1998 | Brodsky | 704/275 |
| 5,828,402 A * | 10/1998 | Collings | 725/28 |
| 5,867,205 A | 2/1999 | Harrison | 348/1 |
| 5,973,683 A * | 10/1999 | Cragun et al. | 345/719 |
| 5,973,723 A * | 10/1999 | DeLuca | 725/34 |
| 5,977,964 A | 11/1999 | Williams et al. | 345/327 |
| 6,061,056 A * | 5/2000 | Menard et al. | 345/704 |
| 6,100,916 A * | 8/2000 | August et al. | 725/28 |
| 6,125,259 A * | 9/2000 | Perlman | 725/28 |
| 6,173,069 B1 * | 1/2001 | Daly et al. | 382/118 |
| 6,298,482 B1 * | 10/2001 | Seidman et al. | 725/101 |
| 6,493,744 B1 * | 12/2002 | Emens et al. | 709/203 |
| 6,614,987 B1 * | 9/2003 | Ismail et al. | 386/83 |
| 6,732,369 B1 * | 5/2004 | Schein et al. | 725/39 |
| 7,185,355 B1 * | 2/2007 | Ellis et al. | 725/46 |
| 7,254,823 B2 * | 8/2007 | Knudson | 725/46 |

FOREIGN PATENT DOCUMENTS

| | | |
|---|---|---|
| EP | 0572090 A2 | 5/1993 |
| EP | 0578300 A2 | 1/1994 |
| EP | 0648054 A2 | 4/1995 |
| EP | 0854645 A2 | 1/1998 |
| EP | 0952732 A2 | 4/1999 |
| GB | 2325537 A | 11/1998 |
| WO | 9013088 A1 | 11/1990 |
| WO | 9530302 A1 | 11/1995 |
| WO | 9735429 | 9/1997 |
| WO | 9739579 | 10/1997 |
| WO | WO9748230 | 12/1997 |
| WO | 9843183 A1 | 10/1998 |
| WO | 9853609 | 11/1998 |
| WO | 9856173 | 12/1998 |
| WO | 9911061 A1 | 3/1999 |

OTHER PUBLICATIONS

"Natural Language Understanding", by James Allen, pp. 505-537, 1995.

"Advances in Automatic Text Summarization", Chapter 16, Generating Concise Natural Language Summaries, pp. 233-263.

"Parsing TV Programs for Identification and Removal of Non-story Segments", by T. McGee et al.

"PNRS—Personal News Retrieval System", by N. Dimitrova et al.

Text, Speech, and Vision for Video Segmentation: The Informedia TM Project, by A. Hauptmann et al.

"Video Keyframe Extraction and Filtering: A Keyframe is not a keyframe to Everyone", by N. Dimitrova et al.

"Face Detection for Image Annotation", by G. Wei et al.

Text Detection for Video Analysis, by L. Agnihotri et al.

"Motion Segmentation and Qualitative Dynamic Scene Analysis from an Image Sequence", by P. Bouthemy et al.

"Uniqueness and Estimation of Three-Dimensional Motion Parameters of Rigid Objects with Curved Surfaces", by R. Tsai et al.

"Content-Based Classification, Search, and Retrieval of Audio", by E. Wold et al.

"Automatic Transcription of English Broadcast News", by P. Beyerlein et al.

"Audio Databases with Content-Based Retrieval", by T. Blum et al.

"Video Classification using Speaker Identification", by N. Patel et al.

"Towards Music Understanding without Separation: Segmenting Music with Correlogram Comodulation", by E. Scheirer.

* cited by examiner

METHOD AND APPARATUS FOR AUDIO/DATA/VISUAL INFORMATION

BACKGROUND OF THE INVENTION

1. Field of the Invention

The present invention relates generally to an audio/data/visual information selection system, and more particularly to a system which filters a stream of audio/data/visual signals, such as television, data or internet-based signals, and provides filtered information, based on user defined parameters, at various levels of content abstraction.

2. Background Information

As the number of television channels increases, a television viewer has a dilemma as to what television shows to watch and how to make the best use of his time while watching television. Since printed and on-screen television listings do not accurately identify the entire content of each television program, many television viewers have taken to "channel surfing" to identify television programs or portions thereof that are "of interest".

Oftentimes, a television viewer spends a great amount of time channel surfing in the hope of identifying television programs which correspond to his interest. This may cause the viewer to miss many other television programs that he would enjoy watching. For example, if there are commercials that are airing on the "surfed" channels, the viewer will encounter delays in identifying the television program that is being broadcast on the "surfed" channel. Therefore it takes longer to determine whether the program being broadcast is of interest. As a result, programming which may be of interest that is broadcast on other channels will be missed. If the viewer does locate a desirable television program, he often encounters uninteresting commercials that are aired during the show, thereby missing a concurrently aired program of interest that is being broadcast on another channel.

Television viewers are generally tired of the ever-increasing number of television channels that have programming of interest only a portion of the time, the multitude of commercials that are aired during programming, and channel surfing. Therefore, a technique for the scanning, smart selection and/or recording of broadcast television and cable programs and/or information that are of interest to a viewer is essential for the television of the future.

Although there have been recent improvements in digital video processing as is evident by new capture boards and fast processors, relatively little advancement has been made on how the information conveyed by video data can best be recovered, analyzed, classified and delivered according to a viewer's desires.

Systems have recently been developed wherein electronic program guide (EPG) data is analyzed based on viewer information that is provided to the system. Based on the analysis of the EPG data, a list of television programs which may be of interest to the viewer is provided. The EPG data is, however, limited and does not enable different levels of content analysis of every video frame or segment of each television program based on viewer defined parameters.

OBJECTS AND SUMMARY OF THE INVENTION

It is an object of the present invention to provide a method and apparatus for audio/data/visual information selection, storage and delivery that overcomes the aforementioned problems with the prior art.

It is another object of the present invention to provide a method and apparatus for audio/data/visual information selection, storage and delivery that monitors a plurality of audio/data/visual signals, identifies audio/data/visual information that is of interest to an individual, and enables use of the identified audio/data/visual information by the individual.

It is another object of the present invention to provide a method and apparatus that selectively records only segments of television-based and/or internet-based information that correspond to the defined parameters.

In accordance with one form of the present invention, a method of selecting desired audio/data/visual information that are of interest and that reflect personal preferences and taste in terms of television programs includes the steps of determining viewing preferences of a viewer, receiving a first plurality of audio/data/visual signals, identifying from the first plurality of audio/data/visual signals a second plurality of audio/data/visual signals to be monitored wherein the second plurality of audio/data/visual signals is a subset of the first plurality of audio/data/visual signals, comparing the viewing preferences with the second plurality of audio/data/visual signals to identify desired audio/data/visual information, and providing access to the desired audio/data/visual information.

In accordance with another aspect of the present invention, a method of selecting desired audio/data/visual information includes the steps of determining preferences of a user, receiving a plurality of audio/data/visual signals, comparing the preferences with the plurality of audio/data/visual signals to identify desired audio/data/visual information, and providing access to the desired audio/data/visual information.

In accordance with another aspect of the present invention, an audio/data/visual signal selection system includes an input device for providing viewing preferences of a viewer, and an information selector. The information selector receives a first plurality of audio/data/visual signals, identifies from the first plurality of audio/data/visual signals a second plurality of audio/data/visual signals to be monitored wherein the second plurality of audio/data/visual signals is a subset of the first plurality of audio/data/visual signals. The information selector also compares the viewing preferences with the second plurality of audio/data/visual signals to identify desired audio/data/visual information, and provides access to the identified audio/data/visual information.

In accordance with another aspect of the present invention, an audio/data/visual signal selection system includes an input device for providing preferences of a user, and an information selector. The information selector receives a plurality of audio/data/visual signals, compares the preferences and the plurality of audio/data/visual signals to identify desired audio/data/visual information, and provides access to the identified audio/data/visual information.

The above and other objects, features and advantages of the present invention will become readily apparent from the following detailed description thereof, which is to be read in connection with the accompanying drawings.

DETAILED DESCRIPTION OF THE PREFERRED EMBODIMENT

The present invention provides an audio/data/visual information selection system ("video scouting system") which monitors a plurality of television or internet-based audio/data/visual signals. The system selects and records audio/data/visual information which may be of interest to a viewer based on the preferences of the viewer. For example, when a person desires to watch television programs relating to certain topics, the person need not know the television programs, the show times and/or the television channels. Moreover, the person need not be present at the time the programs are broadcast. The system of the present invention sets up a programmable wish list for the programs, personalities, characteristics, topics, and events that the person desires to watch. The system then continually monitors the received television signals for items on the wish list, records the entire television program or portions thereof which meet the criteria of the wish list, and enables access to the recorded items for viewing by the viewer at a convenient time.

The audio/data/visual information selection system according to the present invention may be contained within a computer or television, or it may be a stand-alone device coupled to the television or computer, that "surfs" received television, radio or internet-based signals and records desired segments of programs on a local storage device. The selection of program segments is based on content data of the broadcast and cable television or internet-based signal. The content data may include closed-captioned text, EPG data (which can be in the form of meta-data), audio information (such as frequency, pitch, timbre, sound, and melody), visual information (such as color, motion, shape, and texture of 2-D/3-D objects) and transcript information.

While the present invention is described herein in the context of its use in connection with television broadcast signals, it is foreseen that the system can be utilized with computers that have internet accessibility so as to scan internet-based signals (for example as a web crawler or video web portal) for information that is of interest to the user, radios for personalized radio applications so as to scan for particular types of audio signals, information networks (e.g. proprietary networks and personal area networks), and for systems which only transmit data information.

Figure 1:
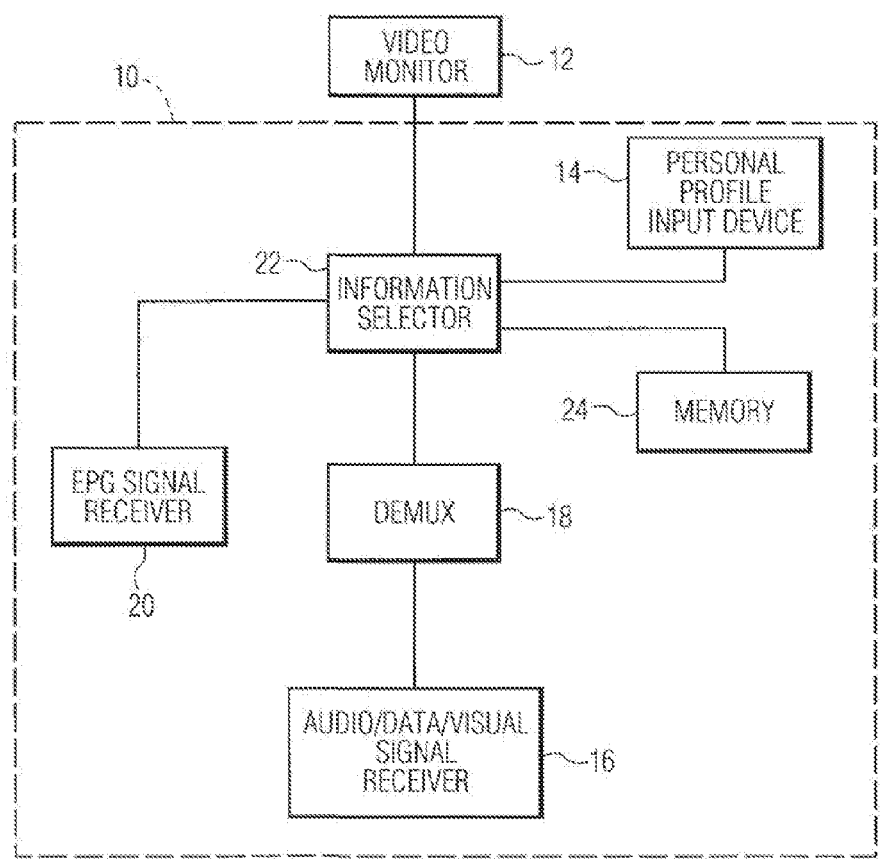
FIG. 1 is a block diagram of the audio/data/visual information selection system according to the present invention.

Referring now to FIG. 1 of the drawings, the apparatus for audio/data/visual information selection 10 is shown. The apparatus is preferably coupled to a video monitor 12, such as a television. The apparatus includes a personal profile input device 14 (for example a keypad, keyboard, on-screen display, television remote control, touchscreen, verbal command receiver or touchpad) by which a user can input personal viewing preferences. The viewing preferences correspond to characteristics of television programs that the user desires to watch (and/or has watched before). A few examples of viewing preferences include sports teams (e.g. New York Yankees), individuals (e.g., President Bill Clinton), locations (e.g., the White House), actions (e.g., a player hitting a home run), and topic (e.g., World Championship). Based on all of the data provided by the user, a profile of the user's viewing preferences is generated. As explained in detail below, the received television signals are monitored for, at least, segments of broadcasts which correspond to the viewing preferences. For example if a viewing preference was "New York Yankees", the present invention would record an entire New York Yankee baseball game, without commercials unless the commercial relates to the New York Yankees, any movie involving the New York Yankees (e.g., "Pride of the Yankees") and the sports portion of a news/sports show which shows highlights of the previous night's New York Yankee baseball game.

It is also foreseen that the apparatus has personal profiles stored in memory for a variety of topics so the user need not input specific viewing preferences, but need only input a number corresponding to a predetermined type of viewing preference (for example, a "1" for sports, "2" for local news, "3" for national news, "4" for world news, "5" for politics, "6" for science fiction, etc.). As a result, the user need not enter a great amount of information for the system to provide a broad range of desired information.

The apparatus also includes an audio/data/visual signal receiver 16 for receiving a plurality of television signals to be analyzed. Instead of filtering out all but one of the signals as performed by a television, the receiver 16 has multiple tuners and maintains all signals for analysis. Suitable audio/data/visual signal receivers include an antenna, satellite dish, set-top box, internet connection, cable and the like. As known in the art, the broadcast and cable television signals provided to the receiver are multiplexed signals.

Operatively coupled to the output of the audio/data/visual signal receiver 16 is a demultiplexer 18 for demultiplexing the multiplexed plurality of television signals received by the audio/data/visual signal receiver. The demultiplexer demultiplexes the plurality of signals and enables each of the plurality of television signals to be individually analyzed as explained in detail below.

In the preferred embodiment the apparatus includes an EPG (electronic programming guide) signal receiver 20 for receiving electronic programming guide signals associated with the plurality of television signals. As known in the art, the EPG signals include a vast assortment of information about the television programs currently being aired and that are to be aired. Examples of EPG information include the title, start time, end time, actors (if applicable), topic, category of program and a brief program description. Suitable EPG signal receivers include an antenna, satellite dish, set-top box, internet connection and the like. It is foreseen that the EPG signal receiver and audio/data/visual signal receiver could be combined into one device wherein the combined device switches between a first mode for receiving audio/data/visual signals and a second mode for receiving EPG signals. Alternatively, the device could concurrently receive audio/data/visual signals and EPG signals.

The apparatus also includes an audio/data/visual information selector 22 which receives the EPG signals from the EPG signal receiver 20, the demultiplexed television signals from the demultiplexer 18 and the viewer preferences from the personal profile input device 14. The audio/data/visual information selector analyzes the demultiplexed audio/data/visual signals based on their content data (explained in detail below), the corresponding EPG signals and the viewing preferences to identify television broadcasts which are of interest to the user. The information might be an entire television program or it could only be a segment thereof if the EPG data indicates that only a segment of the television program corresponds to the viewing preferences. It is important to note that the audio/data/visual information selector is preferably capable of concurrently analyzing each of the television signals provided thereto so as to monitor the television signals in parallel, and to record in a memory the television information identified by the audio/data/visual information selector. An example of a suitable device that can be programmed to perform the functions of the audio/data/visual information selector is a CPU (for example, Pentium or MIPS) of a personal computer, a special programmable Digital Signal Processor (such as Trimedia) or a specially configured chip architecture. The operation of the audio/data/visual information selector will be explained in the detail later.

Operatively coupled to the audio/data/visual information selector 22 is a memory 24 (for example, RAM, hard disk recorder, optical storage device, or DVHS, each having hundreds of giga bytes of storage capability) for recording the television broadcasts or portions thereof identified by the audio/data/visual information selector 22 as corresponding to the viewing preferences. When requested by the user, the audio/data/visual information selector can access the audio/data/visual information stored in the memory and provide the information to the video monitor 12 for review by the user.

Figure 2:
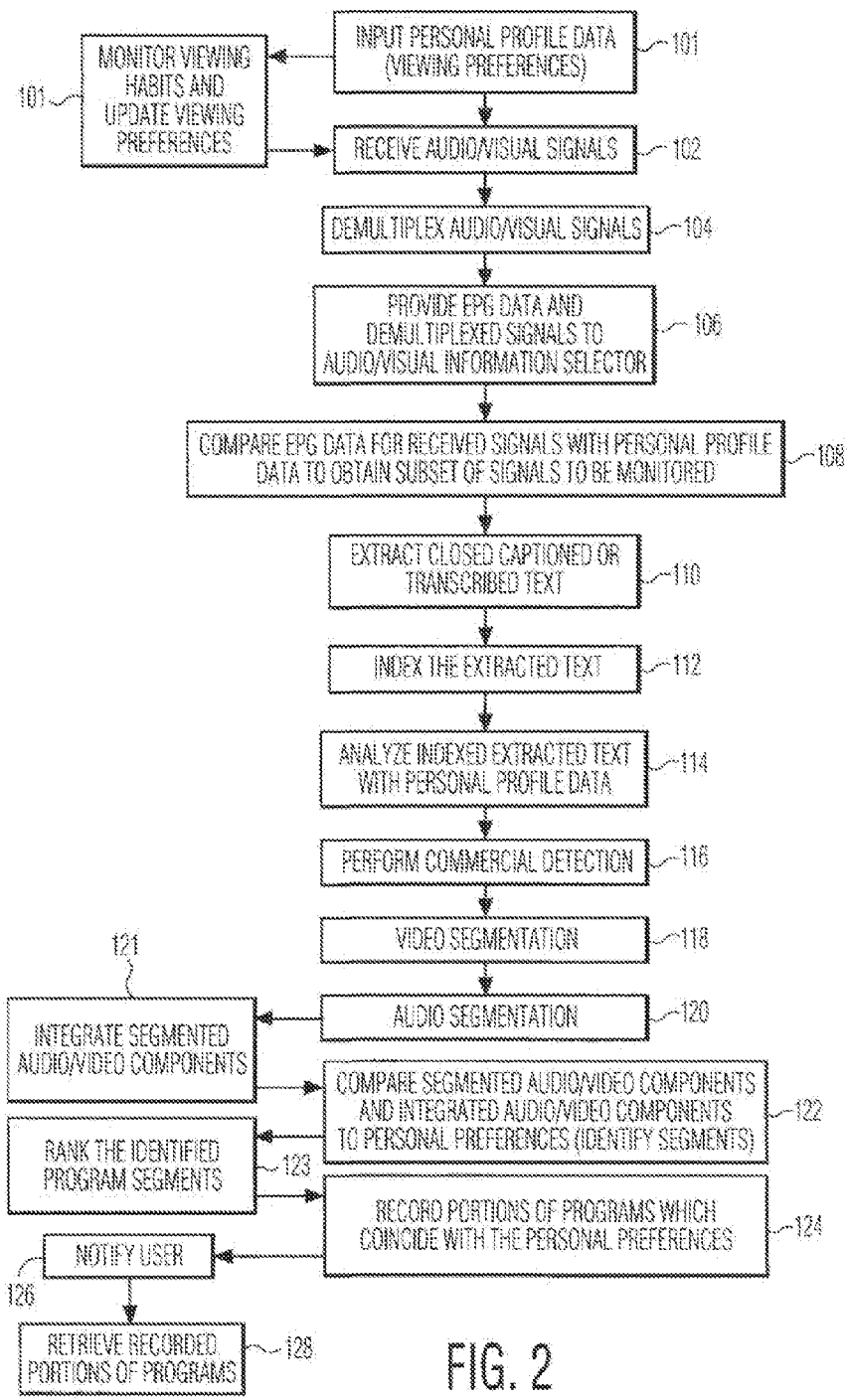
FIG. 2 is a flow chart of the operation of the audio/data/visual information selection system of FIG. 1.

Referring now to FIG. 2, the operation of the apparatus for audio/data/visual information selection, storage and delivery will be described.

Initially, a user inputs personal profile data via the personal profile input device 14 (Step 100). The personal profile corresponds to the viewing preferences of the user such as specific types of television programs, persons or aspects of televisions programs that the viewer desires to watch. This information can be provided in numerous ways. For example, the information can be input via personal profile input device 14. Alternatively, the information can be input through an onscreen guide on the television or video monitor 12 via arrow keys on a conventional television remote control device. Alternative to the above, all of the user profile information can be automatically generated wherein the personal profile input device monitors the viewing habits of the user and, through artificial intelligence, "learns" the personal viewing preferences of the user. It is foreseen that the user profile can evolve based on user behavior and changing viewing interests. It is also foreseen that the information selector or input device monitors the user's changing viewing habits and automatically updates the viewing preferences (Step 101). For example, if the user previously watched only sporting events but has recently been watching a business news channel, the system will modify the original viewing preference (sporting events) to include business news. The personal profile input device preferably stores the "learned" viewing habits in an internal memory (not shown). Alternatively, the "learned" viewing habits are stored in memory 24. It is also foreseen that the user can select one of the pre-stored profiles based on his closest match.

The audio/data/visual signal receiver 16 receives the audio/data/visual television signals available to the viewer (for example, those channels that the viewer subscribes to through the local cable television or satellite service) (Step 102), the television signals are demultiplexed by demultiplexer 18 (Step 104) and provided to the audio/data/visual information selector 22 (Step 106). The EPG signals are received by EPG signal receiver 20 which are then provided to the audio/data/visual information selector 22 (Step 106).

The audio/data/visual information selector 22 performs an initial selection process of the received television signals. Relevant portions of the EPG data for each of the received television signals are compared with the viewing preferences to determine which television programs are not at all associated with the viewing preferences (Step 108). The television programs which are not associated with the viewing preferences are not monitored. As a result, a subset of the received television signals (television programs) is maintained for further analysis and conformance with the viewing parameters. The use of the EPG data is only a first level of filtering to eliminate television programs which are clearly not at all associated with the viewing preferences of the user. For example, if the EPG data for one television signal identifies the corresponding television channel as airing the movie "Gone With the Wind", and the viewing preferences of the user are related to "baseball" or the "stock market", there is no need to monitor this channel while the movie is being shown. However, if the EPG data for another television signal identifies the corresponding channel as currently broadcasting the news, monitoring of this channel would be warranted since the previous night's baseball scores and the day's business news may be discussed.

It should be noted that if EPG data is not available to determine the subset of received television signals to be analyzed, then the audio/data/visual information selector initially monitors a group of preferred channels identified in the viewing preferences or the channels frequently watched by the user. If there are no limits on computation resources of the audio/data/visual information selector, then all available channels will be concurrently monitored.

It should also be mentioned that the non-monitored television programs are periodically checked (i.e., reviewed) to ensure that the programming on the corresponding channel has not changed and is not now broadcasting a program which coincides with the viewing preferences.

Once a subset of television channels has been selected, each of the subset of television channels is continually analyzed in parallel to determine which (if any) portions of the currently aired program correspond to the viewing preferences (each television program is concurrently analyzed). The analysis includes extracting closed-captioned or transcribed text from each television program to be analyzed (Step 110). The extracted closed-captioned or transcribed text is indexed (Step 112). Specifically, indexing, as known in the art, includes monitoring the frequency of occurrence of words in the text so as to provide an indication of the subject matter of the program. Indexing is explained in the publications entitled "Introduction to Modern Information Retrieval" by G. Salton and M. J. McGill, McGraw-Hill, NY, N.Y., 1983; "Natural Language Understanding" by James Allen, The Benjamin/Cummings Publishing Company, Inc., 1995; and "Advances in Automatic Text Summarization", edited by Inderjeet Mani and Mark T. Maybury, The MIT Press, Cambridge, Mass., 1999, the entire disclosures of which are incorporated herein by reference. The indexed text is analyzed to determine whether particular words are frequently used in the programs which have an association with the viewing preferences (Step 114). If frequently used words in the television program do coincide with the viewing preferences, then the program or relevant segment should be noted and either further analyzed or recorded.

Concurrent to the text extraction and indexing, the television programs are monitored for the occurrence of commercials (Step 116). If the viewing preferences do not include an interest in commercials, when a commercial is aired on one of the television channels being analyzed, the present invention does not analyze the commercials so that system resources can be concentrated on the noncommercial television broadcast. Otherwise if the commercials are desired, all commercials can be stored in memory for analysis at a later time.

The method also includes segmentation of the video portion of the television signal (Step 118) to analyze video frames of the television program. In the preferred embodiment, every video frame of each program being monitored is analyzed (that is, in the U.S., 30 video frames are analyzed per second). Video segmentation is known in the art and is generally explained in the publications entitled, "Parsing TV Programs For Identification and Removal of Non-Story Segments", by T. McGee and N. Dimitrova, Proc. of SPIE Conf. on Storage and Retrieval for Image and Video Databases, pp. 243-251, San Jose, Calif., January, 1999; "PNRS-Personal News Retrieval System", by N. Dimitrova, H. Elenbaas and T. McGee, SPIE Conference on Multimedia Storage and Archiving Systems IV, pp. 2-10, September 1999, Boston; and "Text, Speech, and Vision For Video Segmentation: The Infomedia Project" by A. Hauptmann and M. Smith, AAAI Fall 1995 Symposium on Computational Models for Integrating Language and Vision 1995, the entire disclosures of which are incorporated herein by reference. If the user's viewing preferences indicate a desire to view subject matter on John F. Kennedy, any segment of the video portion of the television program including visual (e.g., a face) and/or text information relating to John F. Kennedy will indicate that the current broadcast relates to the user's viewing preferences. As known in the art, video segmentation includes, but is not limited to:

Cut detection: wherein two consecutive video frames are compared to identify abrupt scene changes (hard cuts) or soft transitions (dissolve, fade-in and fade-out). An explanation of cut detection is provided in the publication by N. Dimitrova, T. McGee, H. Elenbaas, entitled "Video Keyframe Extraction and Filtering: A Keyframe is Not a Keyframe to Everyone", Proc. ACM Conf. on Knowledge and Information Management, pp. 113-120, 1997, the entire disclosure of which is incorporated herein by reference.

Face detection: wherein regions of the video frames are identified which contain skin-tone and which correspond to oval-like shapes. In the preferred embodiment, once a face image is identified, the image is compared to a database of known facial images stored in the memory to determine whether the facial image shown in the video frame corresponds to the user's viewing preference. An explanation of face detection is provided in the publication by Gang Wei and Ishwar K. Sethi, entitled "Face Detection for Image Annotation", Pattern Recognition Letters, Vol. 20, No. 11, November 1999, the entire disclosure of which is incorporated herein by reference.

Text detection: wherein text which appears in the video frame such as overlayed or superimposed text is identified and a determination is made as to whether the text is related to the user's viewing preferences. An explanation of text detection is provided in the article entitled "Text Detection in Video Segments" by L. Agnihotri and N. Dimitrova, Proceedings of IEEE Workshop on CBAIVL, Fort Collins, Colo., June 1999, held in conjunction with IEEE Conference on Computer Vision and Pattern Recognition 1999, the entire disclosure of which is incorporated herein by reference. In the preferred embodiment, once the text is detected, optical character recognition (OCR) which is known in the art is employed on the detected regions and a look-up table stored in memory is used to identify the detected text. The look-up table preferably includes associations between a variety of words. For example, "Bill Clinton" may be associated with "President of the United States" and "politics", "White House", "Monica Lewinsky" and "Whitewater".

Motion Estimation/Segmentation/Detection: wherein moving objects are determined in video sequences and the trajectory of the moving object is analyzed. In order to determine the movement of objects in video sequences, known operations such as optical flow estimation, motion compensation and motion segmentation are preferably employed. An explanation of motion estimation/segmentation/detection is provided in the publication by Patrick Bouthemy and Francois Edouard, entitled "Motion Segmentation and Qualitative Dynamic Scene Analysis from an Image Sequence", International Journal of Computer Vision, Vol. 10, No. 2, pp. 157-182, April 1993, the entire disclosure of which is incorporated herein by reference.

Camera Motion: wherein a set of five (5) global camera parameters are employed, preferably two (2) translational and three (3) rotational. The 3-D camera motion is then classified as pure tracking (horizontal motion), booming (vertical motion), dollying (motion in depth), panning (rotation about the vertical global axis), tilting (rotation about the horizontal axis), and rolling (rotation about the z-axis) or combinations of these motions. This information can be used to classify the video shots into, for example, "static", "zoom" and/or "span", and to further determine the director's intention for producing the shot. The camera motion information is used in classification such that if EPG data is not available, the category of the program can be determined based on camera motion. An explanation of camera motion detection is provided in the publication by R. Y. Tsai and T. S. Huang entitled "Uniqueness and Estimation of Three-Dimensional Motion Parameters of Rigid Objects with Curved Surfaces", IEEE Transaction on PAMI, Vol. 6, number 1, pp. 13-27, 1994, the entire disclosure of which is incorporated herein by reference.

The method also includes segmentation of the audio portion of the television signal (Step 120) wherein the audio portion of the television broadcast is monitored for the occurrence of words/sounds that are relevant to the viewing preferences. Audio segmentation includes the following types of analysis of television programs: speech-to-text conversion, audio effects and event detection, speaker identification, program identification, music classification, and dialog detection based on speaker identification.

Audio segmentation includes division of the audio signal into speech and non-speech portions. The first step in audio segmentation involves segment classification using low-level audio features such as bandwidth, energy and pitch. Thereafter channel separation is employed to separate simultaneously occurring audio components from each other (such as music and speech) such that each can be independently analyzed. Thereafter, the audio portion of the television program is processed in different ways such as speech-to-text conversion, audio effects and events detection, and speaker identification. Audio segmentation is known in the art and is generally explained in the publication by E. Wold and T. Blum entitled "Content-Based Classification, Search, and Retrieval of Audio", IEEE Multimedia, pp. 27-36, Fall 1996, the entire disclosure of which is incorporated herein by reference.

Speech-to-text conversion (known in the art, see for example, the publication by P. Beyerlein, X. Aubert, R. Haeb-Umbach, D. Klakow, M. Ulrich, A. Wendemuth and P. Wilcox, entitled "Automatic Transcription of English Broadcast News", DARPA Broadcast News Transcription and Understanding Workshop, VA, Feb. 8-11, 1998, the entire disclosure of which is incorporated herein by reference) can be employed once the speech segments of the audio portion of the television signal are identified or isolated from background noise or music. Speech-to-text conversion is important if closed-captioning is not available to provide a transcript of the audio portion of the television program. The speech-to-text conversion can be used for applications such as keyword spotting with respect to the viewing preferences.

Audio effects can be used for detecting events (known in the art, see for example the publication by T. Blum, D. Keislar, J. Wheaton, and E. Wold, entitled "Audio Databases with Content-Based Retrieval", Intelligent Multimedia Information Retrieval, AAAI Press, Menlo Park, Calif., pp. 113-135, 1997, the entire disclosure of which is incorporated herein by reference). Events can be detected by identifying the sounds that may be associated with specific events. For example, an announcer shouting "goal" in a sporting event could be detected and the program segment could then be recorded in memory if the viewing parameters include replays of hockey or soccer goals.

Speaker identification (known in the art, see for example, the publication by Nilesh V. Patel and Ishwar K. Sethi, entitled "Video Classification Using Speaker Identification", IS&T SPIE Proceedings: Storage and Retrieval for Image and Video Databases V, pp. 218-225, San Jose, Calif., February 1997, the entire disclosure of which is incorporated herein by reference) involves analyzing the voice signature of speech present in the audio signal to determine the identity of the person speaking. Speaker identification can be used, for example, to search for a favorite actor or the comments of a political figure.

Program identification involves analyzing the audio portion of the audio/data/visual signal to identify a television program. This is especially useful in cataloging and indexing of programs. This is important if EPG information is not available. The analyzed audio portion is compared to a library of program characteristics to identify the program to determine if the program coincides with the viewing parameters.

Music classification involves analyzing the non-speech portion of the audio signal to determine the type of music (classical, rock, jazz, etc.) present. This is accomplished by analyzing, for example, the frequency, pitch, timbre, sound and melody of the non-speech portion of the audio signal and comparing the results of the analysis with known characteristics of specific types of music. Music classification is known in the art and explained generally in the publication entitled "Towards Music Understanding Without Separation: Segmenting Music With Correlogram Comodulation" by Eric D. Scheirer, 1999 IEEE Workshop on Applications of Signal Processing to Audio and Acoustics, New Paltz, N.Y. Oct. 17-20, 1999.

After segmentation of the audio and video signals, various portions of the segmented audio and video signals are combined (integrated) (Step 121), if appropriate, to determine if the current television program coincides with the viewing parameters. Integration of the segmented audio and video signals is necessary for complex viewing parameters. For example, if the viewer desires to see a particular actor speak a particular line while making a particular hand gesture, not only is face recognition required (to identify the actor) but also speaker identification (to ensure the actor on the screen is speaking), speech to text conversion (to ensure the actor speaks the appropriate words) and motion estimation/segmentation/detection (to recognize the specified hand gesture of the actor).

As explained above, concurrent to the visual and audio segmentation, the segmented audio and video information is integrated (if applicable) and compared to the viewing preferences (Step 122). Thereafter a determination is made as to whether the current program on the particular channel coincides with the viewing preferences. If so, in the preferred embodiment the program is ranked for its conformance with the viewing preferences (Step 123) and is recorded in memory for as long as the current program coincides with the user's viewing preferences (Step 124). The ranking involves placing video segments which correspond to the user's most favored viewing parameters first in the memory and those related to the least favored viewing preferences last. In this way, when the viewer watches the recorded program segments, the highest ranked will be viewed first.

If the user is concurrently watching another television show while the present invention is operating, the user could concurrently be informed that a television show of interest is being broadcast on a specific channel (Step 126). Upon request by the viewer, the recorded program segments are retrieved and provided for viewing by the user (Step 128).

As mentioned above, it is foreseen that portions of the audio and video segmentation (determined by core AV modules) can be combined (that is, integrated) using mid-level and high-level modules to determine specific events during the television program. The core AV modules include visual and textual modules that provide independent audio and video analysis. These modules by themselves include multiple processing units. The main purpose of the core AV modules is to extract lower-level features that can be used as input to integration modules (mid-level and high-level tools) for inferring higher-level decisions that resemble semantic descriptions of the television program content.

The basic visual attributes are color, motion, shape, and texture. Each of these attributes is described by a large set of operators that range from local operators to regional/global operators. These operators are primitive because they are processed independently from each other and they are task independent. The set of mid-level and high-level integration modules contain tools that combine different elements from the core AV modules. The purpose of the integration modules is to extract high-level information from the content data. This involves multimodal integration of lower-level features. The mid-level tools (modules) typically are used to describe relationships between object parts and audio/data/visual attributes. The high-level tools are used to identify/relate/process objects. These models can be static or dynamic. The dynamic models are updated in time.

What distinguishes high-level from mid-level information is that for the former there exists a decision process in the loop. This means that, internal to the module, there exists a process of deciding which core AV modules to use and under what conditions. Typical examples of the high-level modules are action, event detection/recognition, story segmentation and classification, program classification, and context detection.

If a viewing preference is a specific action of an actor (e.g., opening a door and entering a room), mid-level or high-level modules would be used because not only are face detection and/or voice identification employed, but motion detection is used to pinpoint the action of the particular actor to determine if the action of the actor corresponds with the viewing parameter. As a result, multiple decision loops are employed to analyze the television program.

It is foreseen that the present invention is capable of developing video summaries of entire programs so that the recorded segments that are viewed by the user can be watched in the context of the program (i.e., a "catch-up" function). The video summaries can be developed using key frame images and closed-captioned text to provide an indication of the portions of the program that were not recorded.

It is also foreseen that the viewing preferences can be automatically updated each time that a particular user watches television. This is accomplished based on the viewer's time spent watching certain programs (and the category of programs) as well as the visual and other characteristics of the program (for example, action, bright colors). Parental control can be added to filter out parts of television programs or entire programs based on the content of the program. The present invention can detect scenes of television programs that have nudity, violence or obscene words and prevent those portions of the program from being viewed by minors.

It is foreseen that the system can provide updates to the viewer regarding the information that was recorded while the viewer is watching television. In other words, the viewer is informed that television segments have been recorded which match the viewing parameters while the viewer is watching another television channel. It is also foreseen that if a user is watching one television program and the system identifies a program of interest, the user is informed in real-time of the detection of the program of interest. Further, it is foreseen that the system performs a daily/weekly automatic storage cleanup function of the memory to manage storage space based on the viewing preferences. In the preferred embodiment the system also includes a time catch-up function. Specifically, when the person is surfing television channels and stumbles upon an interesting program, the person can "catch up" by viewing "an extracted video poster" (or abstract, trailer).

The present invention therefore provides a "video scouting system" wherein when a person desires to watch certain types of television programs or only wants to view specific information, the present invention sets up a programmable wish list for the programs, topics and events that the viewer desires watching.

Although the present invention has been discussed relative to finding desirable television programs and television program segments/information for a viewer at the viewer's location, a video brokerage house service could be used for filtering and delivery of specific video segments on demand. Therefore the system would not be located at the user's end, but at, for example, the cable television providers end and the system would operate concurrently for a plurality of users.

The present invention uses and adapts existing techniques such as video segmentation, video parsing, speech recognition, character recognition, and object spotting, for finding cues in the video streams to provide a personalized video information identification system.

Further, it is foreseen that the present invention can be adapted to monitor and record the viewer's feedback and interest in specific programs. The collected information can be valuable for launching new programs, new products, new films and the production of specific events. The present invention is able to capture individual viewer interests. The more the apparatus is used by a person, the better able it is to adapt to the user's diverse interests. The present invention thus models the information about the individual interests that change over time, both as users change and as the system acquires more information about users. This information is useful to advertisers and broadcasting companies. The video filtering system is able to produce a browsable layout of an entire movie or a television program by a video analysis process. Further, the present invention permits a person to preview and prehear the content of a television program as a multimedia presentation. This is achieved by segmenting the video, analyzing its contents and presenting the user with a browsable layout consisting of original and synthetic frames, as well as important conversation segments.

Having described specific preferred embodiments of the invention with reference to the accompanying drawings, it will be appreciated that the present invention is not limited to those precise embodiments and that various changes and modifications can be effected therein by one of ordinary skill in the art without departing from the scope or spirit of the invention defined by the appended claims.

What is claimed is:

1. A method of selecting desired audio/data/visual information from a broadcast of a first plurality of programs, the method comprising acts of:
   determining viewing preferences of a viewer, the viewing preferences are supplied by the viewer, are automatically updated, and indicate a focus selected from at least one of an identity of a participant in, a type of an event in, a location of the event in, a specific action performed in one or more of the plurality of programs;
   receiving on a user apparatus at a viewer's location, an EPG describing characteristics of a first plurality of audio/data/visual programs;
   selecting a second plurality of unmodified audio/data/visual programs from the first plurality of audio/data/visual programs excluding programs described in the EPG as not having characteristics associated with the viewing preferences;
   extracting and indexing closed-captioned or transcribed text and monitoring frequency of occurrence of words in the text from each of the second plurality of unmodified audio/data/visual programs to indicate their focus;
   comparing the focus of said viewing preferences with the focus extracted from each of the second plurality of unmodified audio/data/visual programs to identify desired audio/data/visual information;
   ranking the desired audio/data/visual information based on conformance of their focus with the focus of the viewing preferences; and
   providing access to the ranked desired audio/data/visual information, wherein access to higher ranked desired audio/data/visual information is given priority.

2. The method of selecting desired audio/data/visual information according to claim 1, further comprising acts of:
   storing the ranked desired audio/data/visual information; and
   retrieving the desired audio/data/visual information when requested by the viewer, higher ranked desired audio/data/visual information is retrieved prior to lower ranked desired audio/data/visual information.

3. The method of selecting desired audio/data/visual information according to claim 1, wherein the comparing act comprises acts of:
   extracting content data corresponding to each of said identified second plurality of unmodified audio/data/visual programs;
   indexing said extracted content data; and
   comparing said indexed content data with said viewing preferences to identify the desired audio/data/visual information.

4. The method of selecting desired audio/data/visual information according to claim 3, wherein the extracted content data comprises at least one of audio content and visual content.

5. The method of selecting desired audio/data/visual information according to claim 4, wherein the extracted content data comprises visual content, wherein the visual content comprises at least one of color, motion, shape, texture of 2-D/3-D objects, cut detection, face detection, motion estimation/segmentation/detection and camera motion.

6. The method of selecting desired audio/data/visual information according to claim 4, wherein the extracted content data comprises audio content, wherein the audio content comprises at least one of speaker identification, music classification and dialog detection based on speaker identification.

7. The method of selecting desired audio/data/visual information according to claim 4, wherein the extracted content data comprises audio content, wherein the audio content comprises at least one of frequency, pitch, timbre, sound, and melody.

8. The method of selecting desired audio/data/visual information according to claim 1, further comprising an act of integrating at least two of closed-captioning text, EPG data, extracted audio content, extracted visual content, and extracted transcript, wherein said viewing preferences are based on said integrating.

9. The method of selecting desired audio/data/visual information according to claim 8, wherein the integrating act provides for integrating at least three of the closed-captioning text, the EPG data, the extracted audio content, the extracted visual content, and the extracted transcript.

10. The method of selecting desired audio/data/visual information according to claim 9, wherein the integrating act comprises detection of at least one of human faces and scenery.

11. The method of selecting desired audio/data/visual information according to claim 1, wherein said desired audio/data/visual information comprises at least one of broadcast television programs, cable television programs, internet-based programs and data.

12. The method of selecting desired audio/data/visual information according to claim 1, wherein the monitoring act comprises an act of comparing the EPG data for each of the first plurality of audio/data/visual programs with the viewing preferences to identify the second plurality of unmodified audio/data/visual programs.

13. The method of selecting desired audio/data/visual information according to claim 1, wherein the determining act comprises an act of inputting, via at least one of a keypad, keyboard, on-screen display, remote control, touchscreen, verbal commands and touchpad, characteristics of the desired audio/data/visual information that the viewer desires to watch.

14. The method of selecting desired audio/data/visual information according to claim 1, further comprising an act of automatically updating the viewing preferences each time that the viewer accesses at least one of broadcast television programs, cable television programs and internet-based programs from the first plurality of audio/data/visual programs.

15. The method of selecting desired audio/data/visual information according to claim 1, further comprising an act of identifying commercial and noncommercial portions of the second plurality of unmodified audio/data/visual programs.

16. The method of selecting desired audio/data/visual information according to claim 1, wherein the providing act comprises an act of storing at least a portion of said desired audio/data/visual information in memory.

17. The method of selecting desired audio/data/visual information according to claim 1, further comprising an act of notifying the viewer that desired audio/data/visual information has been identified.

18. The method of selecting desired audio/data/visual information according to claim 17, wherein the viewer is notified while the viewer is interacting with audio/data/visual programs.

19. The method of selecting desired audio/data/visual information according to claim 1, wherein the method is concurrently performed for a plurality of viewers.

20. A method of selecting desired audio/data/visual information from a broadcast of a first plurality of programs, the method comprising acts of:
 determining by a user apparatus viewing preferences of a user, the viewing preferences are supplied by the user, are automatically updated, and indicate a focus selected from at least one of an identity of a participant in, a type of an event in, a location of the event in, a specific action performed in one or more of the plurality of programs;
 selecting a subset from a plurality of audio/data/visual programs on a basis of a characteristics described in an EPG received by the user apparatus at a users location, wherein the programs in the subset excludes programs described in the EPG as not having characteristics associated with the viewing preferences;
 extracting and indexing closed-captioned or transcribed text and monitoring frequency of occurrence of words in the text from each of the second plurality of unmodified audio/data/visual programs to indicate their focus;
 comparing the focus of said viewing preferences with the focus extracted from each program of the subset of the plurality of unmodified audio/data/visual programs to identify desired audio/data/visual information;
 ranking the desired audio/data/visual information based on conformance of their focus with the focus of the viewing preferences; and
 providing access to the ranked desired audio/data/visual information, wherein access to higher ranked desired audio/data/visual information is given priority.

21. The method of selecting desired audio/data/visual information according to claim 20, further comprising an act of selecting at least one of the subset of the plurality of unmodified audio/data/visual programs for comparison with said viewing preferences.

22. The method of selecting desired audio/data/visual information according to claim 21, wherein the selection of at least one of the plurality of unmodified audio/data/visual programs is performed at least one of randomly, sequentially, and periodically.

23. The method of selecting desired audio/data/visual information according to claim 20, further comprising acts of:
 storing the ranked desired plurality of audio/data/visual information; and
 retrieving the desired plurality of audio/data/visual information, wherein the higher ranked desired audio/data/visual information is retrieved prior to retrieving the lower ranked desired audio/data/visual information.

24. The method of selecting desired audio/data/visual information according to claim 20, wherein the comparing act comprises acts of:
 extracting content data corresponding to each program of said subset of the plurality of unmodified audio/data/visual programs;
 indexing said extracted content data; and
 comparing said indexed content data with said viewing preferences to identify the desired audio/data/visual information.

25. The method of selecting desired audio/data/visual information according to claim 24, wherein the extracted content data comprises at least one of audio content and visual content.

26. The method of selecting desired audio/data/visual information according to claim 25, wherein the extracted content data comprises visual content, wherein the visual content comprises at least one of color, motion, shape, texture of 2-D/3-D objects, cut detection, face detection, motion estimation/segmentation/detection and camera motion.

27. The method of selecting desired audio/data/visual information according to claim 25, wherein the extracted content data comprises audio content, wherein the audio content comprises at least one of speaker identification, music classification and dialog detection based on speaker identification.

28. The method of selecting desired audio/data/visual information according to claim 25, wherein the extracted content data comprises audio content, wherein the audio content comprises at least one of frequency, pitch, timbre, sound, and melody.

29. The method of selecting desired audio/data/visual information according to claim 20, further comprising an act of integrating at least two of closed-captioning text, EPG data, extracted audio content, extracted visual content, and extracted transcript, wherein said viewing preferences are updated based on said integrating.

30. The method of selecting desired audio/data/visual information according to claim 29, wherein the integrating act provides for integrating at least three of the closed-captioning text, the EPG data, the extracted audio program, the extracted visual content, and the extracted transcript.

31. The method of selecting desired audio/data/visual information according to claim 30, wherein the integrating act comprises detection of at least one of human faces and scenery.

32. The method of selecting desired audio/data/visual information according to claim 20, wherein said desired audio/data/visual information comprises at least one of broadcast television programs, cable television programs, internet-based programs, and data.

33. The method of selecting desired audio/data/visual information according to claim 20, wherein the comparing act comprises an act of comparing electronic programming guide (EPG) data for each program of the subset of the plurality of unmodified audio/data/visual programs with the viewing preferences to identify a second plurality of unmodified audio/data/visual programs which are associated with the viewing preferences.

34. The method of selecting desired audio/data/visual information according to claim 20, wherein the determining act comprises an act of inputting, via at least one of a keypad, keyboard, on-screen display, remote control, touchscreen, verbal commands and touchpad, characteristics of audio/data/visual information that the user desires.

35. The method of selecting desired audio/data/visual information according to claim 20, wherein the determining act comprises an act of monitoring the user's interaction with the plurality of audio/data/visual signals to formulate characteristics of audio/data/visual information that the user desires.

36. The method of selecting desired audio/data/visual information according to claim 20, further comprising an act of automatically updating the viewing preferences each time the user accesses at least one of broadcast television programs, cable television programs, internet-based programs and data.

37. The method of selecting desired audio/data/visual information according to claim 20, further comprising an act of identifying commercial and noncommercial portions of the plurality of unmodified audio/data/visual programs.

38. The method of selecting desired audio/data/visual information according to claim 20, wherein the providing act comprises an act of storing at least a portion of said ranked desired audio/data/visual information in a memory, a higher ranked desired audio/data/visual information is stored prior to storing a lower ranked desired audio/data/visual information.

39. The method of selecting desired audio/data/visual information according to claim 20, further comprising an act of notifying the user that desired audio/data/visual information has been identified.

40. The method of selecting desired audio/data/visual information according to claim 38, wherein the user is notified while the user is interacting with audio/data/visual programs.

41. The method of selecting desired audio/data/visual information according to claim 20, wherein the method is concurrently performed for a plurality of users.

42. An audio/data/visual program selection system comprising:
an input device for providing viewing preferences of a viewer, the viewing preferences are supplied by the viewer, are automatically updated, and indicate a focus selected from at least one of an identity of a participant in, a type of an event in, a location of the event in, a specific action performed in one or more of the plurality of programs; and
an information selector for:
receiving at a viewer's location, an EPG describing characteristics of a first plurality of audio/data/visual programs;
selecting a second plurality of unmodified audio/data/visual programs from the first plurality of audio/data/visual programs excluding programs described in the EPG as not having characteristics associated with the viewing preferences;
extracting and indexing closed-captioned or transcribed text and monitoring frequency of occurrence of words in the text from each of the second plurality of unmodified audio/data/visual programs to indicate their focus;
comparing the focus of said viewing preferences with the focus extracted from each of the second plurality of unmodified audio/data/visual programs to identify desired audio/data/visual information;
ranking the desired audio/data/visual information based on conformance of their focus with the focus of the viewing preferences; and
providing access to the ranked identified audio/data/visual information, access to higher ranked desired audio/data/visual information is given priority.

43. The audio/data/visual program selection system according to claim 42, wherein the information selector also stores the ranked desired audio/data/visual information, and retrieves the desired audio/data/visual information upon request by the viewer, the higher ranked desired audio/data/visual information is retrieved prior to retrieving the lower ranked desired audio/data/visual information.

44. The audio/data/visual program selection system according to claim 42, wherein said desired plurality of audio/data/visual information comprises at least one of broadcast television programs, cable television programs, internet-based programs and data.

45. The audio/data/visual program selection system according to claim 42, wherein the information selector compares the EPG data for each of the first plurality of audio/data/visual programs with the viewing preferences to identify the second plurality of unmodified audio/data/visual programs which are associated with the viewing preferences.

46. The audio/data/visual program selection system according to claim 42, wherein the input device comprises at least one of a keypad, keyboard, on-screen display, remote control, touchscreen, audio sensor and touchpad.

47. The audio/data/visual program selection system according to claim 42, wherein the information selector monitors the viewing habits of the viewer with the first plurality of audio/data/visual programs to formulate characteristics of audio/data/visual information that the viewer desires to watch.

48. The audio/data/visual program selection system according to claim 42, wherein the information selector:
extracts content data from each of the second plurality of unmodified audio/data/visual programs;
indexes the extracted content data; and
compares the indexed content data with the viewing preferences to identify the desired audio/data/visual information.

49. The audio/data/visual program selection system according to claim 48, wherein the extracted content data comprises at least one of audio content and video content.

50. The audio/data/visual program selection system according to claim 49, wherein the extracted content data comprises video content, wherein the video content comprises at least one of color, motion, shape, texture of 2-D/3-D objects, cut detection, face detection, motion estimation/segmentation/detection and camera motion.

51. The audio/data/visual program selection system according to claim 49, wherein the extracted content data comprises audio content, wherein the audio content comprises at least one of speaker identification, music classification and dialog detection based on speaker identification.

52. The audio/data/visual program selection system according to claim 49, wherein the extracted content data comprises audio content, wherein the audio content comprises at least one of frequency, pitch, timbre, sound, and melody.

53. The audio/data/visual program selection system according to claim 42, wherein said viewing preferences is based on integrating at least two of closed-captioning text, EPG data, audio content, video content, and transcript.

54. The audio/data/visual program selection system according to claim 53, wherein the integrating provides for integrating at least three of the closed-captioning text, the EPG data, the extracted audio content, the extracted video content, and the extracted transcript.

55. The audio/data/visual program selection system according to claim 54, wherein the integrating comprises detection of at least one of human faces and scenery.

56. The audio/data/visual program selection system according to claim 42, wherein the information selector determines commercial and noncommercial portions of the second plurality of audio/data/visual programs.

57. The audio/data/visual program selection system according to claim 42, further comprising a memory, operatively coupled to the information selector, for storing at least a portion of said desired audio/data/visual information.

58. The audio/data/visual program selection system according to claim 42, wherein the information selector automatically updates the viewer preferences each time that the viewer accesses at least one of broadcast television programs, cable television programs, internet-based programs and data.

59. The audio/data/visual program selection system according to claim 42, further comprising:
an audio/data/visual program receiver for receiving the first plurality of audio/data/visual programs; and
a demultiplexer operatively coupled between the audio/data/visual program receiver and the audio/data/visual information selection, storage and delivery device for demultiplexing the first plurality of audio/data/visual programs and providing a demultiplexed first plurality of audio/data/visual programs as an output signal.

60. The audio/data/visual program selection system according to claim 42, wherein the information selector notifies the viewer that the desired audio/data/visual information has been identified.

61. The audio/data/visual program selection system according to claim 60, wherein the viewer is notified while the viewer is interacting with audio/data/visual programs.

62. The audio/data/visual program selection system according to claim 42, wherein the system is centrally located and operatively coupled for use by a plurality of viewers.

63. An audio/data/visual program selection system comprising:
an input device for providing viewing preferences of a user, the viewing preferences are supplied by the user, are automatically updated, and indicate a focus selected from at least one of an identity of a participant in, a type of an event in, a location of the event in, a specific action performed in one or more of the plurality of programs; and
an information selector for:
selecting a subset from a plurality of audio/data/visual programs on a basis of a characteristics described in an EPG received at a users location, wherein the programs in the subset excludes programs described in the EPG as not having characteristics associated with the viewing preferences;
extracting and indexing closed-captioned or transcribed text and monitoring frequency of occurrence of words in the text from each of the second plurality of unmodified audio/data/visual programs to indicate their focus;
comparing the focus of said viewing preferences and the focus extracted from each of the subset of audio/data/visual programs to identify desired audio/data/visual information;
ranking the desired audio/data/visual information based on conformance of their focus with the focus of the viewing preferences; and
providing access to the desired audio/data/visual information, wherein access to higher ranked desired audio/data/visual information is given priority.

64. The audio/data/visual program selection system according to claim 63, further comprising a memory, operatively coupled to the information selector, for storing at least a portion of said ranked desired audio/data/visual information, wherein a higher ranked desired audio/data/visual information is stored prior to storing a lower ranked desired audio/data/visual information.

65. The audio/data/visual program selection system according to claim 63, further comprising:
an audio/data/visual program receiver for receiving the first set of the plurality of audio/data/visual programs; and
a demultiplexer operatively coupled between the audio/data/visual programs receiver and the information selector for demultiplexing the first set of the plurality of audio/data/visual programs and providing a demultiplexed first plurality of audio/data/visual programs as an output signal.

66. The audio/data/visual program selection system according to claim 63, wherein the information selector also stores the desired ranked audio/data/visual information, and retrieves the desired audio/data/visual information upon request by the user, wherein the higher ranked programs are retrieved prior to retrieving the lower ranked programs.

67. The audio/data/visual program selection system according to claim 63, wherein said desired plurality of audio/data/visual information comprises at least one of broadcast television programs, cable television programs, internet-based programs and data.

68. The audio/data/visual program selection system according to claim 63, wherein the input device comprises at least one of a keypad, keyboard, on-screen display, remote control, touchscreen, audio sensor and touchpad.

69. The audio/data/visual program selection system according to claim 63, wherein the information selector monitors the user's interaction with the first set of the plurality of audio/data/visual programs to formulate characteristics of audio/data/visual information that the users desire.

70. The audio/data/visual program selection system according to claim 63, wherein the information selector:
extracts content data from each of the first set of the plurality of audio/data/visual programs;
indexes the extracted content data; and compares the indexed content data and the identified subset of audio/data/visual programs with the viewing preferences to identify the desired plurality of audio/data/visual information.

71. The audio/data/visual program selection system according to claim 70, wherein the extracted content data comprises at least one of audio content and video content.

72. The audio/data/visual program selection system according to claim 71, wherein the extracted content data comprises video content, wherein the video content comprises at least one of color, motion, shape, texture of 2-D/3-D objects, cut detection, face detection, motion estimation/segmentation/detection and camera motion.

73. The audio/data/visual program selection system according to claim 71, wherein the extracted content data comprises audio content, wherein the audio content comprises at least one speaker identification, music classification and dialog detection based on speaker identification.

74. The audio/data/visual program selection system according to claim 71, wherein the extracted content data comprises audio content, wherein the audio content comprises at least one of frequency, pitch, timbre, sound, and melody.

75. The audio/data/visual program selection system according to claim 71, wherein said viewing preferences are updated based on integrating at least two of the closed-captioning text, the EPG data, the audio content, the video content, and the transcript.

76. The audio/data/visual program selection system according to claim 75, wherein the integration provides for integrating at least three of the closed-captioning text, the EPG data, the extracted audio content, the extracted video content, and the extracted transcript.

77. The audio/data/visual program selection system according to claim 76, wherein the integrating comprises detection of at least one of human faces and scenery.

78. The audio/data/visual program selection system according to claim 63, wherein the information selector determines commercial and noncommercial portions of the plurality of audio/data/visual programs.

79. The audio/data/visual program selection system according to claim 63, wherein the information selector automatically updates the viewing preferences each time the user accesses at least one of broadcast television programs, cable television programs, internet-based programs and data from the first set of the plurality of audio/data/visual programs.

80. The audio/data/visual program selection system according to claim 63, wherein the information selector notifies the user that the desired audio/data/visual information has been identified.

81. The audio/data/visual program selection system according to claim 80, wherein the user is notified while the user is interacting with audio/data/visual information.

82. The audio/data/visual program selection system according to claim 63, wherein the system is centrally located and operatively coupled for use by plurality of users.

* * * * *